United States Patent
Golan et al.

(10) Patent No.: US 8,224,028 B1
(45) Date of Patent: Jul. 17, 2012

(54) SYSTEM AND METHOD FOR QUEUE ANALYSIS USING VIDEO ANALYTICS

(75) Inventors: Oren Golan, Or-Yehuda (IL); Or Sheffet, Ramat Gan (IL); Shmuel Kiro, Rehovot (IL); Itshak Horovitz, Rishon Lezion (IL)

(73) Assignee: Verint Systems Ltd., Herzilya Pituach (IL)

( * ) Notice: Subject to any disclaimer, the term of this patent is extended or adjusted under 35 U.S.C. 154(b) by 968 days.

(21) Appl. No.: 12/234,927

(22) Filed: Sep. 22, 2008

Related U.S. Application Data

(60) Provisional application No. 61/050,108, filed on May 2, 2008.

(51) Int. Cl.
*G06K 9/00* (2006.01)
(52) U.S. Cl. ......... 382/103; 348/143; 348/150; 340/937
(58) Field of Classification Search .................. None
See application file for complete search history.

(56) References Cited

U.S. PATENT DOCUMENTS

| | | | | |
|---|---|---|---|---|
| 6,195,121 | B1* | 2/2001 | Huang et al. ................. | 348/150 |
| 7,242,423 | B2* | 7/2007 | Lin ............................... | 348/169 |
| 2004/0091134 | A1* | 5/2004 | Long ............................ | 382/104 |
| 2007/0253595 | A1* | 11/2007 | Sorensen ...................... | 382/103 |
| 2008/0303902 | A1* | 12/2008 | Romer et al. ................. | 348/143 |
| 2009/0249342 | A1* | 10/2009 | Johnson ........................ | 718/101 |

OTHER PUBLICATIONS

Press Release by IRISYS, Oct. 5, 2006.*
Ismail Haritaoglu and Myron Flickner, "Detection and Tracking of Shopping Groups in Stores", 2001, Proceedings of the 2001 IEEE Computer Society Conference on Computer Vision and Pattern Recognition, pp. I-431-I-438.*
A.W. Senior, L. Brown, A. Hampapur, C. -F.Shu, Y. Zhai, R.S. Feris, Y.-L. Tian, S. Borger, C. Carlson, "Video Analytics for Retail", Sep. 5-7, 2007, IEEE Conference on Advanced Video and Signal Based Surveillance, pp. 423-428.*

* cited by examiner

*Primary Examiner* — Jason M Repko
*Assistant Examiner* — Siamak Harandi

(57) ABSTRACT

A method for analyzing queues using video analytics is provided. The method includes receiving a video comprising a plurality of images of a scene. The scene includes a queue region and an operation region. The method also includes processing at least a first image of the plurality of images to determine an occurrence of a first event associated with the operation region, and processing at least a second image of the plurality of images to determine an occurrence of a second event associated with the operation region. The method further includes determining an operation time based on an amount of time between the first event and the second event, processing at least a third image of the plurality of images to determine a quantity of entities in the queue region, and determining a wait time based on the operation time and the quantity of entities in the queue region.

11 Claims, 9 Drawing Sheets

SYSTEM AND METHOD FOR QUEUE ANALYSIS USING VIDEO ANALYTICS

RELATED APPLICATIONS

This application hereby claims the benefit of and priority to U.S. Provisional Patent Application 61/050,108, titled "SYSTEM AND METHOD FOR QUEUE ANALYSIS USING VIDEO ANALYTICS", filed on May 2, 2008, and which is hereby incorporated by reference in its entirety.

TECHNICAL FIELD

Aspects of this invention are related in general to the field of video analytics. In particular, aspects of this invention are related to the analysis of a wait time for a queue using video analytics.

TECHNICAL BACKGROUND

In a typical retail environment, when customers have finished selecting items they wish to purchase, they stand in a queue at a register waiting for an employee to complete their purchase transaction. Many businesses maintain a number of registers sufficient to serve a maximum number of customers. Typically, during normal shopping hours, some of these registers remain unstaffed, and are only used during peak shopping hours and seasons, such as the week before Christmas. A business must trade off the amount of time a customer is forced to wait in a queue against the number of registers that are open. If too few registers are open, customer wait times may be excessive, resulting in decreased customer satisfaction that may eventually result in lost business as these customers refuse to return to the business. However, if too many registers are open, there may be times when registers are staffed but no customers are ready to complete their transactions. This results in lost efficiency since the employees still must be paid to staff the registers while waiting for customers to appear, when they could be doing other productive work within the business.

Queues are also found in other environments, such as manufacturing facilities, where assemblies may queue up before a station where they are processed. For example, in auto manufacturing, partially assembled cars may queue to be painted. In an ideal situation, the manufacturing queue would be very short. However, there may be occasions when the queue grows substantially, putting time pressure on the overall assembly process.

Overview

A method for analyzing queues using video analytics is provided. The method includes receiving a video comprising a plurality of images of a scene. The scene includes a queue region and an operation region. The method also includes processing at least a first image of the plurality of images to determine an occurrence of a first event associated with the operation region, and processing at least a second image of the plurality of images to determine an occurrence of a second event associated with the operation region. The method further includes determining an operation time based on an amount of time between the first event and the second event, processing at least a third image of the plurality of images to determine a quantity of entities in the queue region, and determining a wait time based on the operation time and the quantity of entities in the queue region.

In another embodiment, the first event includes a first of the entities entering the operation region. In a further embodiment, the second event includes the first of the entities leaving the operation region. In still another embodiment, the second event includes a second of the entities entering the operation region.

In another embodiment, the operation of determining the operation time based on the amount of time between the first event and the second event includes determining a first time when the first event occurred, determining a second time when the second event occurred, and calculating the operation time by subtracting the first time from the second time.

In a further embodiment, the operation of determining the operation time based on the amount of time between the first event and the second event includes determining an image rate of the video, determining a number of the images in the video between the first event and the second event, and calculating the operation time by dividing the number of images by the image rate.

In another embodiment, the operation of determining the operation time includes averaging operation times for more than one of the entities.

In a further embodiment, the queue region includes the operation region. In another embodiment, the operation of determining the wait time includes multiplying the operation time by the quantity of entities in the queue region.

In another embodiment, a video processing system comprising an interface configured to receive video, and a processor coupled with the interface is provided. The processor is configured to receive a video comprising a plurality of images of a scene through the interface. The scene includes a queue region and an operation region. The processor is also configured to process at least a first image of the plurality of images to determine an occurrence of a first event associated with the operation region, and to process at least a second image of the plurality of images to determine an occurrence of a second event associated with the operation region. The processor is further configured to determine an operation time based on an amount of time between the first event and the second event, to process at least a third image of the plurality of images to determine a quantity of entities in the queue region, and to determine a wait time based on the operation time and the quantity of entities in the queue region.

In a further embodiment, a computer-readable medium having instructions stored thereon for operating a computer system is provided. The instructions, when executed by the computer system, direct the computer system to receive a video comprising a plurality of images of a scene. The scene includes a queue region and an operation region. The instructions further direct the computer system to process at least a first image of the plurality of images to determine an occurrence of a first event associated with the operation region, and to process at least a second image of the plurality of images to determine an occurrence of a second event associated with the operation region. The instructions also direct the computer system to determine an operation time based on an amount of time between the first event and the second event, to process at least a third image of the plurality of images to determine a quantity of entities in the queue region, and to determine a wait time based on the operation time and the quantity of entities in the queue region.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

In an embodiment, video analytics is used to process video images of a scene containing a register queue in a retail environment, and to produce estimated customer wait times for the queue. The scene contains a queue region and a transaction (or operation) region. The queue region includes all of the customers (or entities) waiting for service at a register. The transaction (or operation) region includes the customer currently being served at the register. The transaction region may be a subset of the queue region. The video is analyzed to determine times at which a customer enters and leaves the transaction region. These times are used to calculate a customer transaction (or operation) time. Alternatively, the transaction time may be estimated from the time a first customer enters the transaction region to the time a second customer enters the transaction region. This transaction (or operation) time may be averaged among multiple customers over a longer period of time. An estimated wait time is calculated from the transaction time and the number of customers in the queue.

Other embodiments may analyze queues in other environments, such as a manufacturing environment, or the like. These other environments also include a queue region and a transaction region. In a manufacturing environment the transaction region may be the location where an assembly stage or step occurs.

Figure 1:
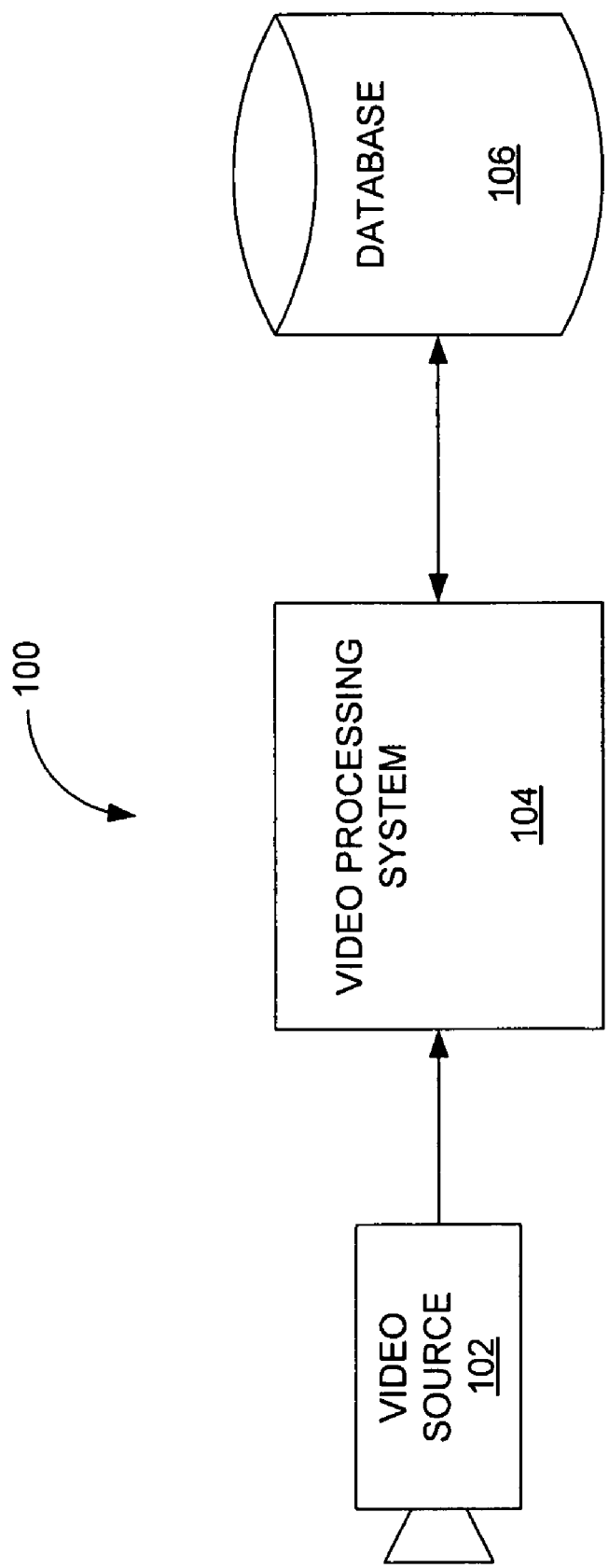
FIG. 1 is a block diagram illustrating a video system for queue analysis using video analytics.

FIG. 1 is a block diagram illustrating a video system 100 for queue analysis using video analytics. In this example video system 100, video processing system 104 is coupled with video source 102 and database 106. Video source 102 captures video and passes this data to video processing system 104, which analyzes the video, analyzes a queue, and stores the video in database 106. Other embodiments of video processing system 104 may pass video data from video source 102 directly to database 106 for recording, and then process the video retrieved from database 106 at a later time. Video processing system 104 analyzes the video to determine the number of entities in a queue, determine an operation time, and estimate a wait time.

In this example embodiment, video source 102 produces a video comprising a series of images of a scene. Video source 102 is configured to record interactions at one or more locations. The scene contains an operation region and a queue region. The operation region is the area of the scene where an entity is located while its operation is completed. The queue region is the area of the scene where other entities stand while waiting their turn at the station or operation region. Some embodiments may define the queue region to include the operation region, while other embodiments may define two separate, non-overlapping operation and queue regions.

In order to estimate the wait time for the queue, video processing system 104 analyzes the series of images in the video received from video source 102 to determine how much time an operation takes, and then multiplies this operation time by the number of entities in the queue to determine a wait time for the queue. Operation times may be calculated using any of a variety of methods. For example, video processing system 104 may determine how long an entity spends in the operation region of the image, and use that time as the operation time, and as the basis for the wait time calculation.

In some embodiments video system 100 and in particular video processing system 104 may be used to perform the operations illustrated in FIGS. 3 through 6 described below. Other embodiments may use video systems different than that illustrated in FIG. 1 to perform the operations illustrated in FIGS. 3 through 6 described below. For example, some video systems may include a plurality of video sources, video processing systems, and databases. Other systems may incorporate the database into the video processing system. Still other systems may distribute the database throughout a network. All of these video systems may be configured to perform the operations illustrated in FIGS. 3 through 6 described below.

Figure 2:
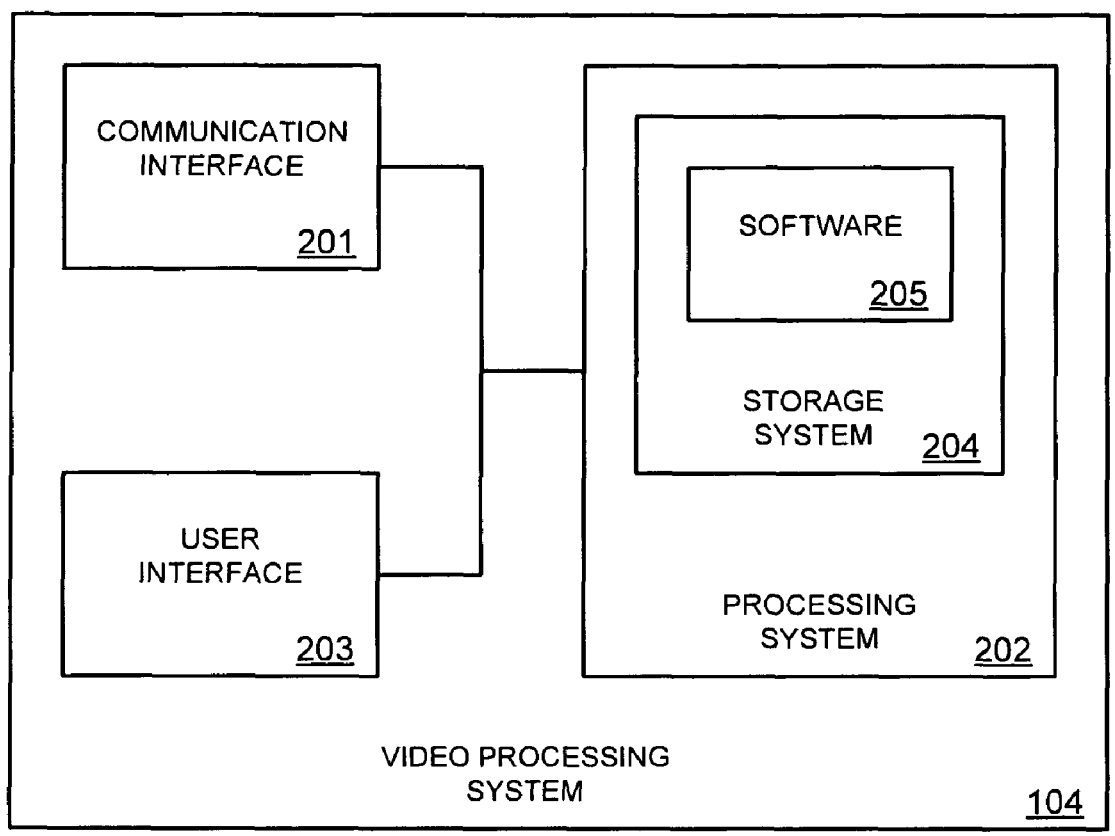
FIG. 2 is a block diagram illustrating a video processing system configured to perform queue analysis using video analytics.

FIG. 2 is a block diagram illustrating a video processing system configured to perform queue analysis using video analytics. Video processing system 104 includes communication interface 201, processing system 202, and user interface 203. Processing system 202 includes storage system 204. Storage system 204 stores software 205. Processing system 202 is linked to communication interface 201 and user interface 203. Video processing system 104 could include a programmed general-purpose computer, although those skilled in the art will appreciate that programmable or special purpose circuitry and equipment may be used. Video processing system 104 may be distributed among multiple devices that together make up elements 201-205.

Communication interface 201 could include a network interface, modem, port, transceiver, or some other communication device. Communication interface 201 may be distributed among multiple communication devices. Communication interface 201 may be configured to receive video from video source 102. Processing system 202 could include a computer microprocessor, logic circuit, or some other processing device. Processing system 202 may be distributed among multiple processing devices. User interface 203 could include a keyboard, mouse, voice recognition interface, microphone and speakers, graphical display, touch screen, or some other type of user device. User interface 203 may be distributed among multiple user devices. Storage system 204 could include a disk, tape, integrated circuit, server, or some other memory device. Storage system 204 may be distributed among multiple memory devices. Storage system 204 may be configured to operate as database 106.

Processing system 202 retrieves and executes software 205 from storage system 204. Software 205 may include an operating system, utilities, drivers, networking software, and other software typically loaded onto a computer system. Software 205 could include an application program, firmware, or some other form of machine-readable processing instructions. When executed by processing system 202, software 205 directs processing system 202 to operate as described herein.

Figure 3:
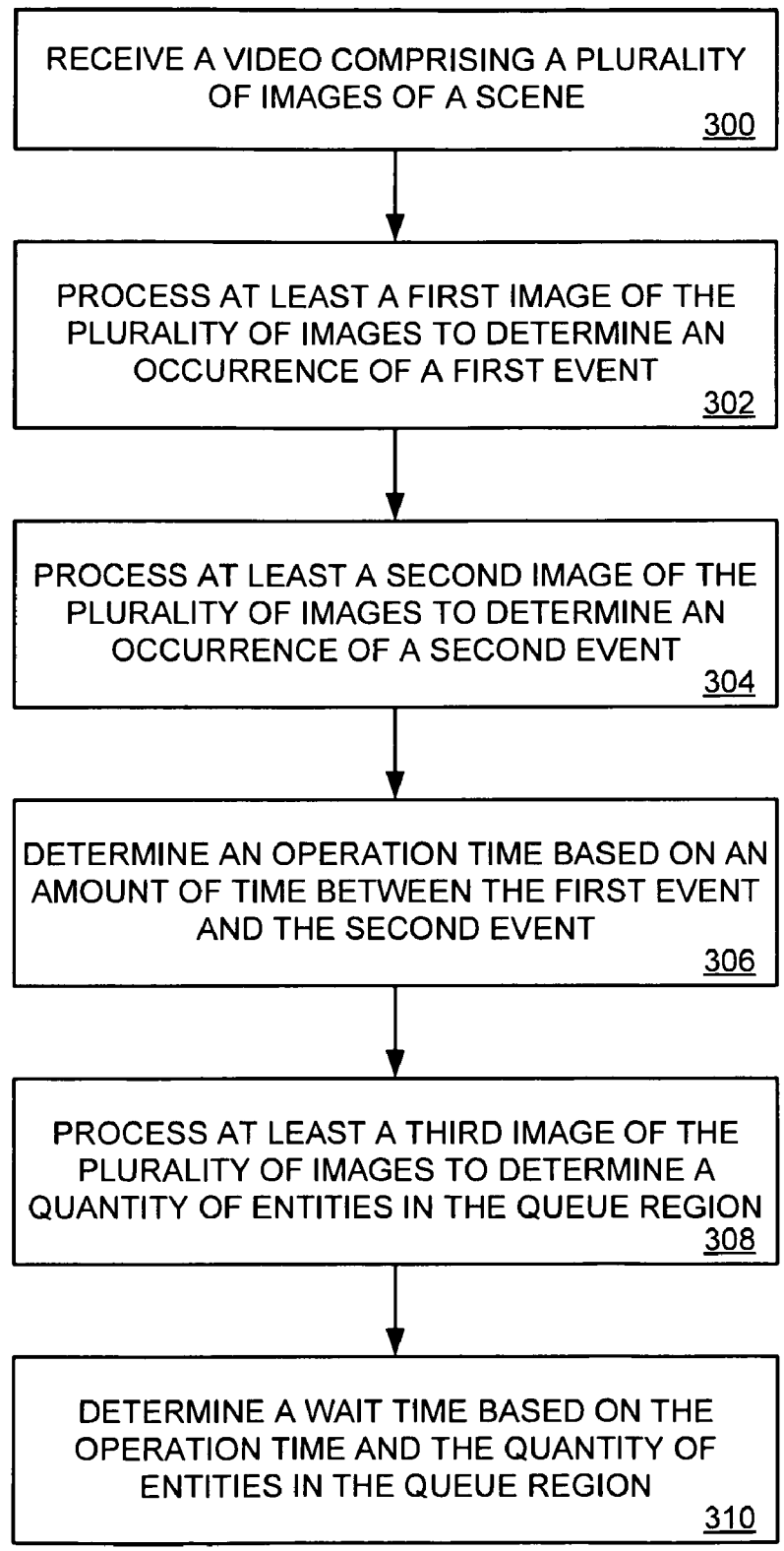
FIG. 3 is a flow diagram illustrating a method for queue analysis using video analytics.

FIG. 3 is a flow diagram illustrating a method for queue analysis using video analytics. Reference numbers from FIG. 3 are indicated parenthetically below. Video processing system 104 receives a video from video source 102, or database 106 (operation 300). The video includes a plurality of images of a scene, and the scene includes a queue region and an operation region (or transaction region). Some examples may include more than one queue region and operation region within the scene. Video processing system 104 processes at least a first image of the plurality of images to determine the occurrence of a first event (operation 302). This first event is used to calculate an operation time. For example, the first event may be a first entity moving from the queue region into the operation region since this would mark the start of the operation time. Video processing system 104 then processes at least a second image of the plurality of images to determine the occurrence of a second event (operation 304). This second event is also used in calculating an operation time. For example, the second event may be the first entity leaving the operation region at the conclusion of the transaction. In some examples, the first entity is a first customer waiting in a queue for a register. In other examples, the first entity is a manufacturing assembly waiting in a queue for an additional assembly operation.

Video processing system 104 then determines an operation time based on an amount of time between the first event and the second event (operation 306). Using the above examples, the first event may occur when the first customer enters the operation region, and the second event may occur when the first customer leaves the operation region. The operation time quantifies the amount of time that the first customer spent in the operation region of the video. Video processing system 104 also processes at least a third image of the plurality of images to determine a quantity of entities in the queue region of the scene (operation 308). This third image may be any of the video images, including the first and second images described above.

Video processing system 104 then determines a wait time for the queue based on the operation time and the quantity of entities in the queue region (operation 310). This wait time may be calculated by multiplying the operation time by the quantity of entities in the queue region. The wait time represents approximately how long an arriving entity would have to wait in the queue before arriving at the operation region. Some applications may use the wait times of one or more registers to determine when additional registers or operations should be opened, or to advise customers of the shortest available wait time in a queue, since it may be that the quickest queue does not contain the fewest number of customers. For example, the wait time for a long queue with a very short operation (or transaction) time may be less than that associated with a short queue with a very long operation time.

Figure 4:
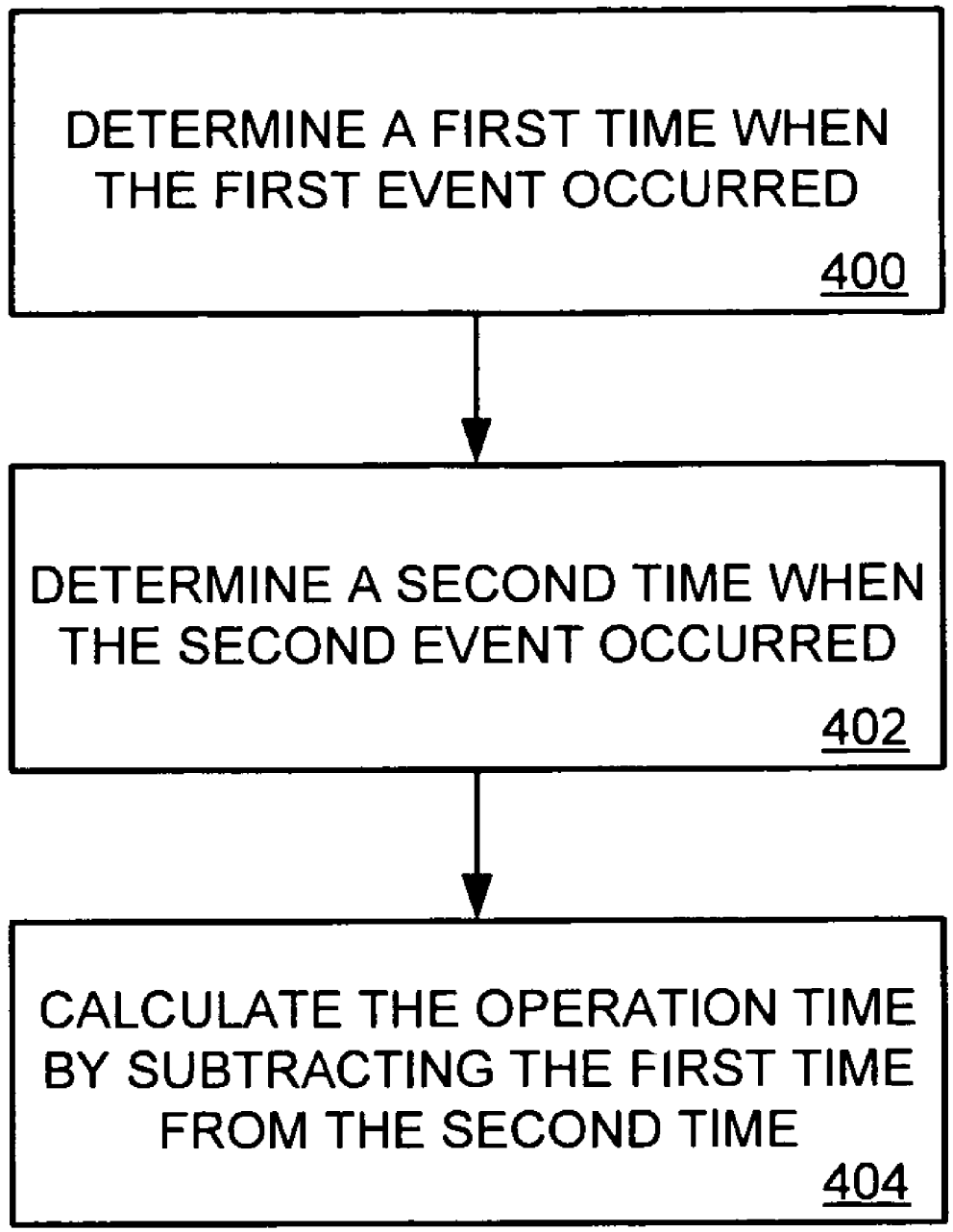
FIG. 4 is a flow diagram illustrating a method for determining a transaction time using video analytics.

FIG. 4 is a flow diagram illustrating a method for determining a transaction time using video analytics. Reference numbers from FIG. 4 are indicated parenthetically below. Video processing system 104 determines a first time when the first event occurred (operation 400). This first time may be determined by a time stamp on the video, or any of a wide variety of methods. The time may be represented in any usable format such as hours:minutes:seconds, or the like.

Video processing system 104 also determines a second time when the second event occurred (operation 402). For efficient calculations, ideally the first and second times use the same format. Video processing system 104 then calculates the transaction time by subtracting the first time from the second time.

Figure 5:
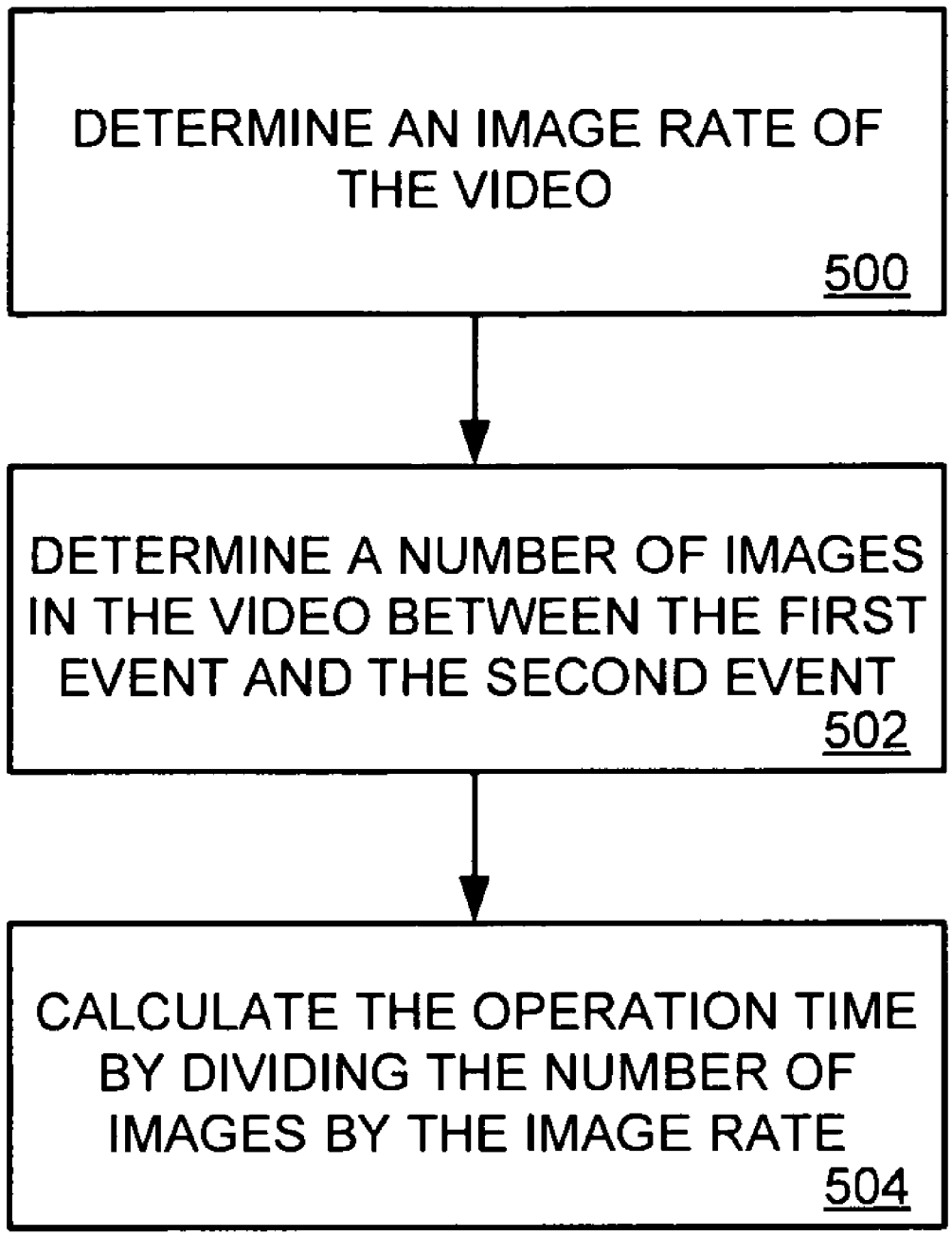
FIG. 5 is a flow diagram illustrating a method for determining a transaction time using video analytics.

FIG. 5 is a flow diagram illustrating a method for determining a transaction time using video analytics. Reference numbers from FIG. 5 are indicated parenthetically below. Video processing system 104 determines an image rate of the video (operation 500). This image rate may also be called a frame rate and may be measured as images-per-second or frames-per-second for the video. 30 or 60 images-per-second are common image rates. Video processing system 104 also determines a number of images in the video between the first event and the second event (operation 502). This operation may be performed by subtracting the image numbers of the occurrences of the two events. For videos without image number information, the operation may be performed by counting the number of images between the two events. Video processing system 104 then calculates the transaction time by dividing the number of images by the image rate (operation 504). If the image rate is quantified in images-per-second, this calculation produces a transaction time quantified in seconds.

Figure 6:
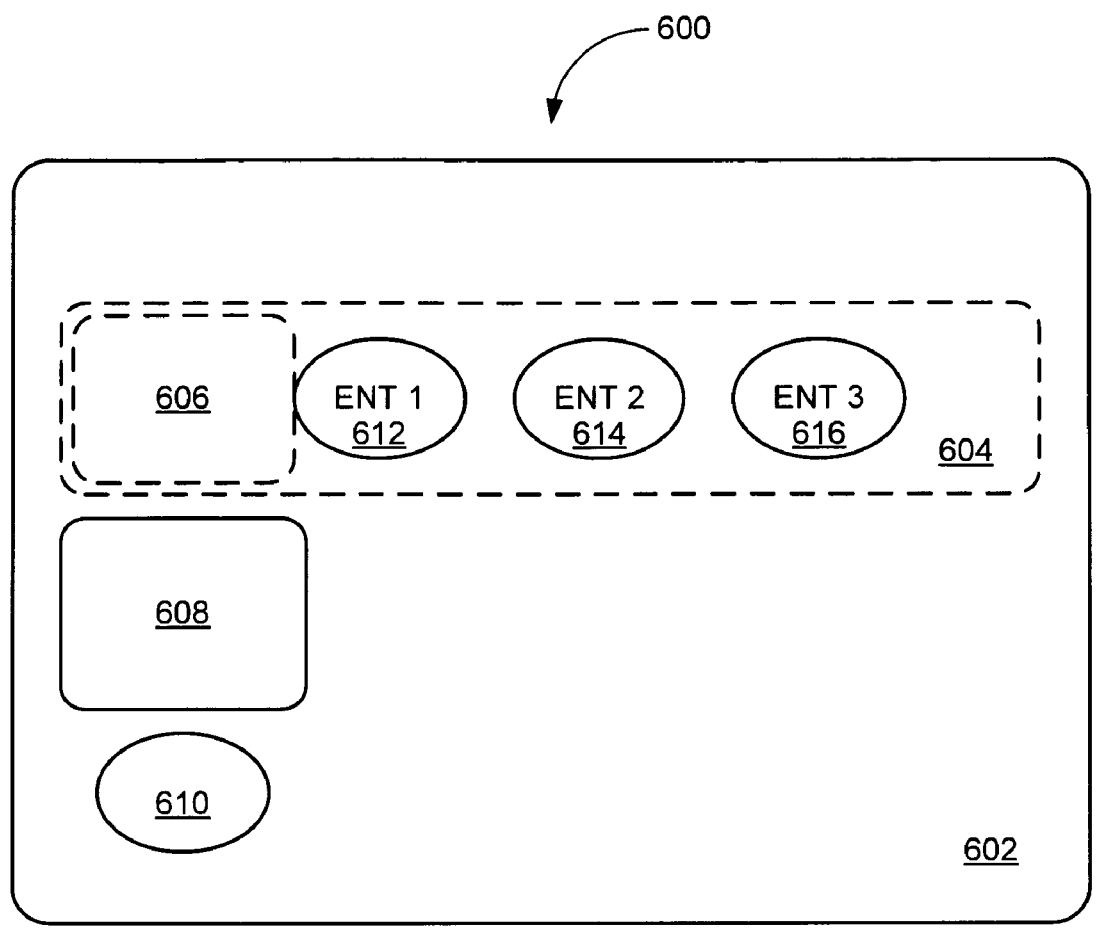
FIG. 6 is an illustration of a first example video image from a video used by a video processing system to analyze a queue.

FIG. 6 is an illustration of an example scene 602 from a video image 600 used by video processing system 104 to analyze a queue. This example scene 602 includes queue region 604, operation region 606, station 608, operator 610, and three entities 612, 614, and 616. Entity 1 612 is just entering operation region 606, while entity 2 614 and entity 3 616 are waiting in queue region 604. In this example image 602, entity 1 612 is just starting to enter operation region 606. Video processing system 104 may recognize this occurrence as a first event. Other embodiments may have differing criteria for the occurrence of a first event. For example, other embodiments may recognize the first event when the entity has completely entered operation region 606, or when the entity is halfway into operation region 606.

Figure 7:
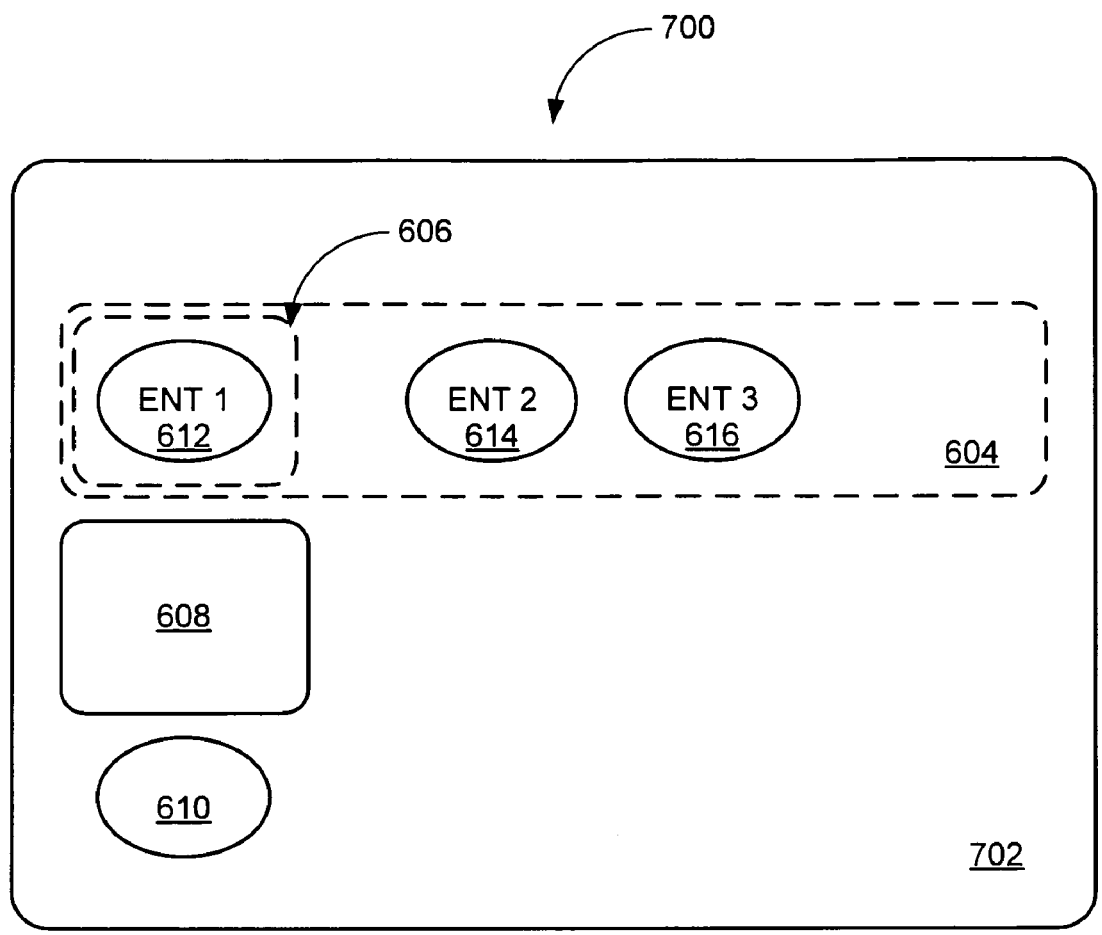
FIG. 7 is an illustration of a second example video image from a video used by a video processing system to analyze a queue.

FIG. 7 is an illustration of an example scene 702 from a video image 700 used by video processing system 104 to analyze a queue. In this scene 702, entity 1 612 is completely within operation region 606 and operator 610 is completing the operation at station 608. Entity 2 614 and entity 3 616 remain waiting in queue region 604.

Figure 8:
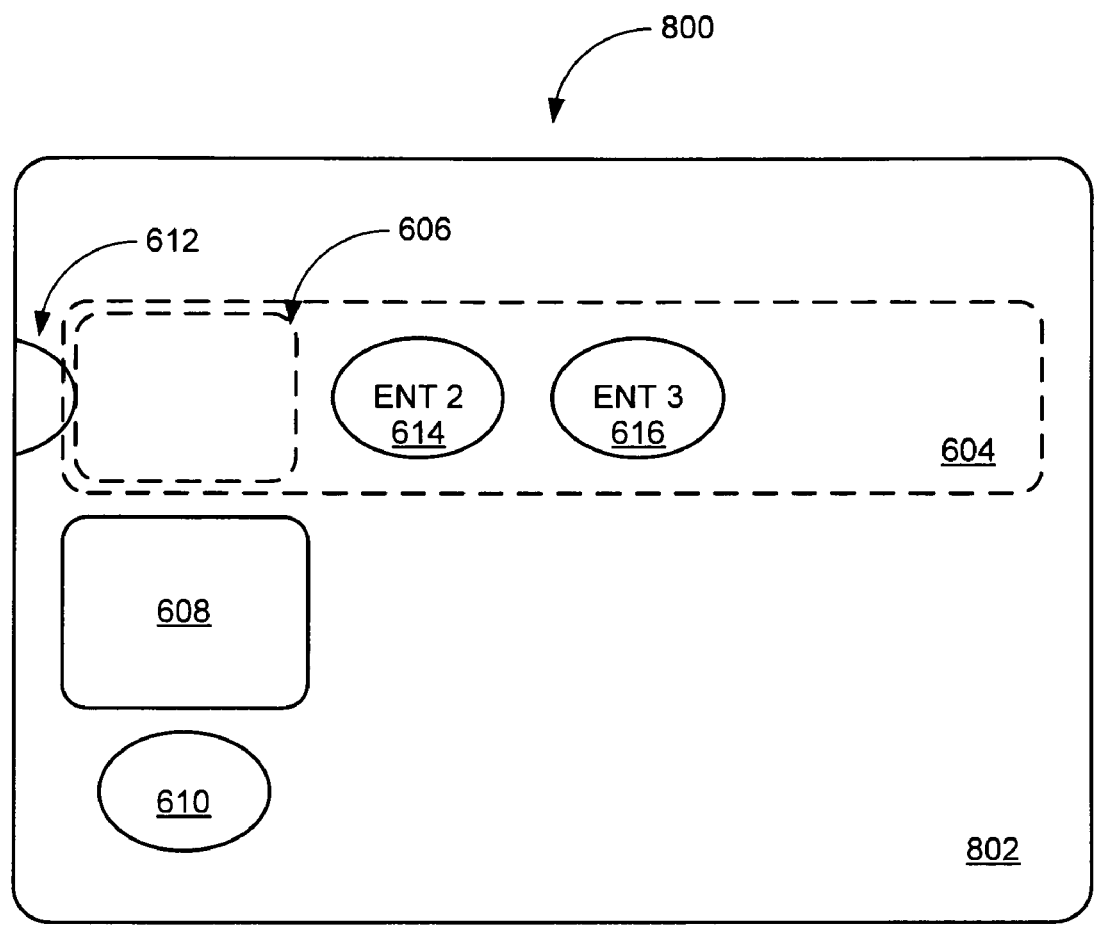
FIG. 8 is an illustration of a third example video image from a video used by a video processing system to analyze a queue.

FIG. 8 is an illustration of an example scene 802 from a video image 800 used by video processing system 104 to analyze a queue. In this scene 802, entity 1 612 is seen leaving operation region 606. Video processing system 104 may recognize this occurrence as a second event, and the end of the operation for entity 1 612. Entity 2 614 and entity 3 616 remain waiting in queue region 604. Other embodiments may use other criteria for the occurrence of a second event. One such embodiment is illustrated in FIG. 9 and described below.

Figure 9:
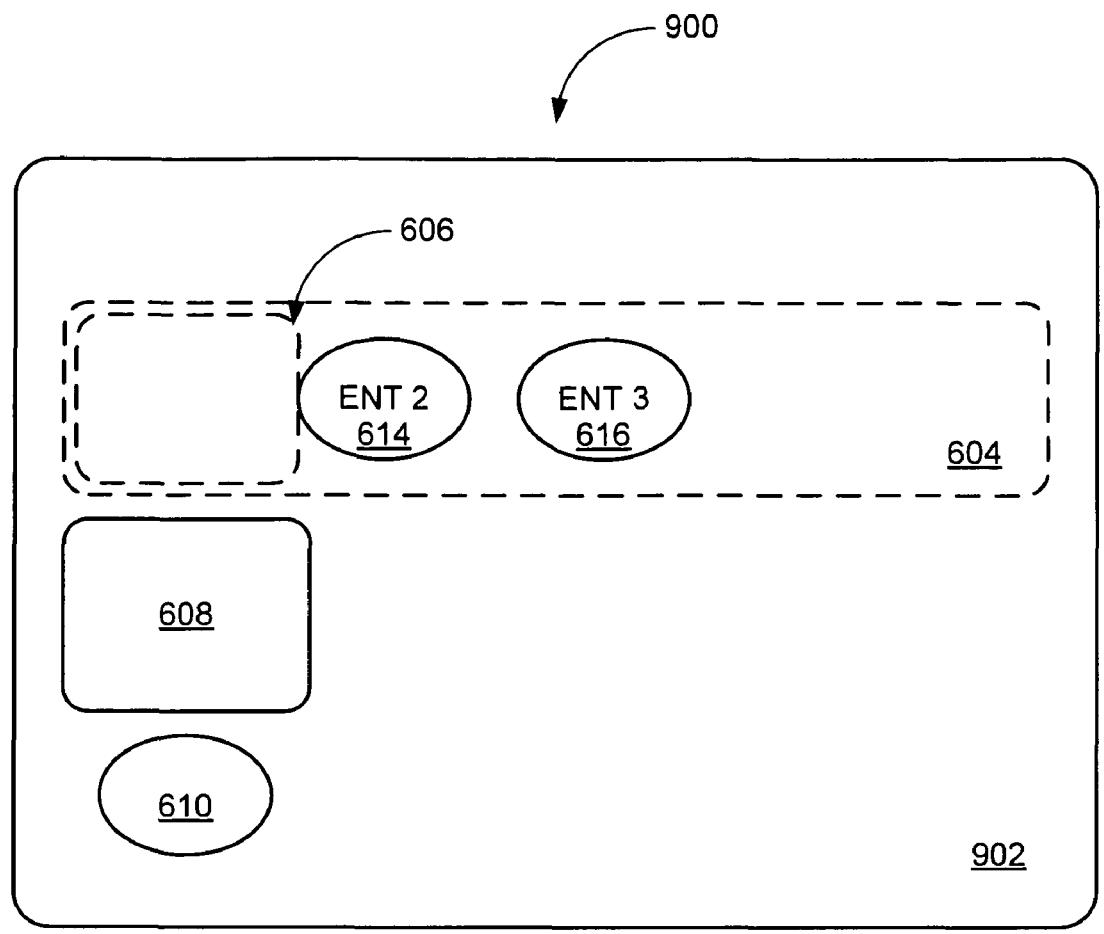
FIG. 9 is an illustration of a fourth example video image from a video used by a video processing system to analyze a queue.

FIG. 9 is an illustration of an example scene 902 from a video image 900 used by video processing system 104 to analyze a queue. In this scene 902, entity 1 612 has completely left image 902. Entity 2 614 has just started to enter operation region 606. Video processing system 104 may recognize this occurrence as a second event, the end of the operation for entity 1 612, and the beginning of the operation for entity 2 604. Entity 3 616 remains waiting in queue region 604.

One should note that the flowcharts included herein show the architecture, functionality, and/or operation of a possible implementation of software. In this regard, each block can be interpreted to represent a module, segment, or portion of code, which includes one or more executable instructions for implementing the specified logical function(s). It should also be noted that in some alternative implementations, the functions noted in the blocks may occur out of the order depicted. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions (such as depicted in the flowcharts), can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured media.

It should be emphasized that the above-described embodiments are merely possible examples of implementations, merely set forth for a clear understanding of the principles of this disclosure. Many variations and modifications may be made to the above-described embodiments without departing substantially from the principles of the disclosure. All such modifications and variations are intended to be included herein within the scope of this disclosure.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for analyzing queues using video analytics, comprising:
   receiving a video comprising a plurality of images of a scene including a plurality of entities in the scene, wherein the scene comprises a queue region and an operation region;
   processing at least a first image of the plurality of images to determine an occurrence of a first event associated with the operation region, the first event comprising a first of the plurality of entities entering the operation region;
   processing at least a second image of the plurality of images to determine an occurrence of a second event associated with the operation region, the second event comprising a second of the plurality of entities entering the operation region;
   determining an operation time based on an amount of time between the first event and the second event;
   processing at least a third image of the plurality of images to determine a quantity of entities in the queue region; and
   determining a wait time based on the operation time and the quantity of entities from the plurality of entities in the queue region.

2. The method of claim 1, wherein determining the operation time based on the amount of time between the first event and the second event comprises:
   determining a first time when the first event occurred;
   determining a second time when the second event occurred; and
   calculating the operation time by subtracting the first time from the second time.

3. The method of claim 1, wherein determining the operation time based on the amount of time between the first event and the second event comprises:
   determining an image rate of the video;
   determining a number of the images in the video between the first event and the second event; and
   calculating the operation time by dividing the number of images by the image rate.

4. The method of claim 1, wherein determining the operation time comprises:
   averaging operation times for more than one of the entities.

5. The method of claim 1, wherein the queue region comprises the operation region.

6. The method of claim 1, wherein determining the wait time comprises:
   multiplying the operation time by the quantity of entities in the queue region.

7. A video processing system comprising:
   an interface configured to receive video; and
   a processor coupled with the interface;
   wherein the processor is configured to:
      receive a video comprising a plurality of images of a scene including a plurality of entities in the scene through the interface, wherein the scene comprises a queue region and an operation region;
      process at least a first image of the plurality of images to determine an occurrence of a first event associated with the operation region, the first event comprising a first of the plurality of entities entering the operation region;
      process at least a second image of the plurality of images to determine an occurrence of a second event associated with the operation region, the second event comprising a second of the plurality of entities entering the operation region;
      determine an operation time based on an amount of time between the first event and the second event;
      process at least a third image of the plurality of images to determine a quantity of entities in the queue region; and
      determine a wait time based on the operation time and the quantity of entities from the plurality of entities in the queue region.

8. The video processing system of claim 7, wherein the processor is configured to determine the operation time based on the amount of time between the first event and the second event by:
   determining a first time when the first event occurred;
   determining a second time when the second event occurred; and calculating the operation time by subtracting the first time from the second time.

9. The video processing system of claim 7, wherein the processor is configured to determine the operation time based on the amount of time between the first event and the second event by:
- determining an image rate of the video;
- determining a number of the images in the video between the first event and the second event; and
- calculating the operation time by dividing the number of images by the image rate.

10. A non-transitory computer-readable medium having instructions stored thereon for operating a computer system, wherein the instructions, when executed by the computer system, direct the computer system to:
- receive a video comprising a plurality of images of a scene including a plurality of entities in the scene, wherein the scene comprises a queue region and an operation region;
- process at least a first image of the plurality of images to determine an occurrence of a first event associated with the operation region, the first event comprising a first of the pluralities of entities entering the operation region;
- process at least a second image of the plurality of images to determine an occurrence of a second event associated with the operation region, the second event comprising a second of the pluralities of entities entering the operation region;
- determine an operation time based on an amount of time between the first event and the second event;
- process at least a third image of the plurality of images to determine a quantity of entities in the queue region; and
- determine a wait time based on the operation time and the quantity of entities from the plurality of entities in the queue region.

11. The non-transitory computer-readable medium of claim 10, wherein the instructions direct the computer system to determine the operation time based on the amount of time between the first event and the second event by:
- determining a first time when the first event occurred;
- determining a second time when the second event occurred; and
- calculating the operation time by subtracting the first time from the second time.

* * * * *